United States Patent [19]
Conrad

[11] 3,980,174
[45] Sept. 14, 1976

[54] CLOSED LOOP RIBBED BELT/GROOVED PULLEY CONVEYOR SYSTEM

[75] Inventor: René A. Conrad, Woodside, Calif.
[73] Assignee: Dynaloc Corporation, San Mateo, Calif.
[22] Filed: Oct. 10, 1975
[21] Appl. No.: 621,589

[52] U.S. Cl. ............................ 198/835; 74/241; 198/837
[51] Int. Cl.² .................................. B65G 15/62
[58] Field of Search .......... 198/193, 202, 137, 138, 198/203; 74/240, 241

[56] References Cited
UNITED STATES PATENTS

| | | | |
|---|---|---|---|
| 207,626 | 9/1878 | Sargent | 198/202 |
| 3,050,178 | 8/1962 | Stone | 198/193 |
| 3,812,732 | 5/1974 | Conrad | 74/240 |

Primary Examiner—John J. Love
Assistant Examiner—Joseph E. Valenza
Attorney, Agent, or Firm—Boone, Schatzel & Hamrick

[57] ABSTRACT

A closed loop conveyor system comprising a cylindrical drive pulley and a cylindrical return pulley, each including at least one groove having a generally W-shaped transverse cross section, and a conveyor belt disposed around the drive pulley and return pulley and having a carcass with an exterior load-carrying surface and an interior surface that includes at least one groove-engaging rib formed in the direction of belt travel. The bottom surface of the rib has a transverse cross section in the shape of an inverted V serving to bifurcate the rib into two wedging portions which engage and are spread apart by the bottom wall of the groove, thereby causing the rib to lockingly mate with the groove.

8 Claims, 6 Drawing Figures

U.S. Patent Sept. 14, 1976 Sheet 1 of 2 3,980,174
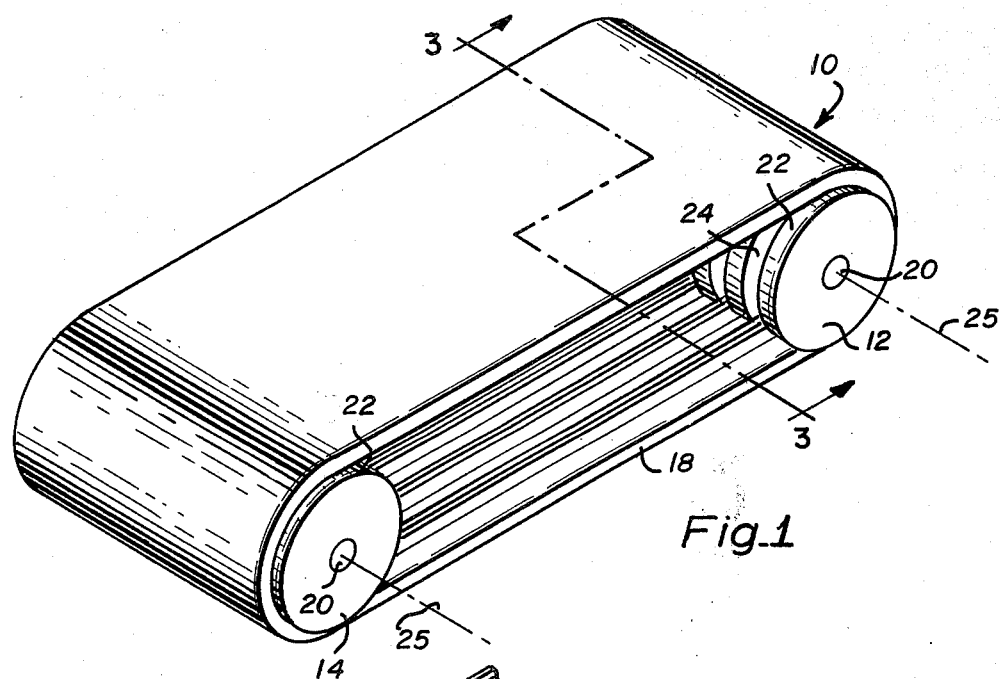
Fig_1
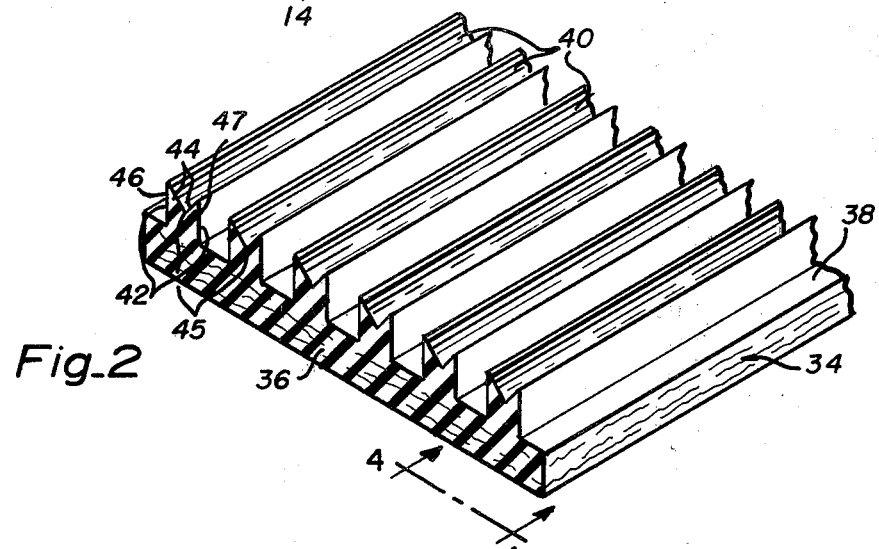
Fig_2
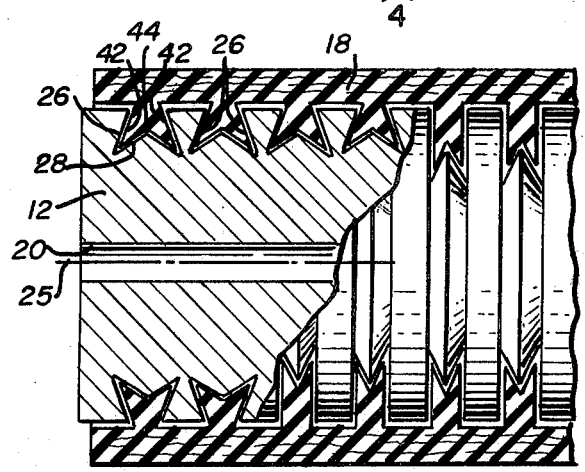
Fig_3

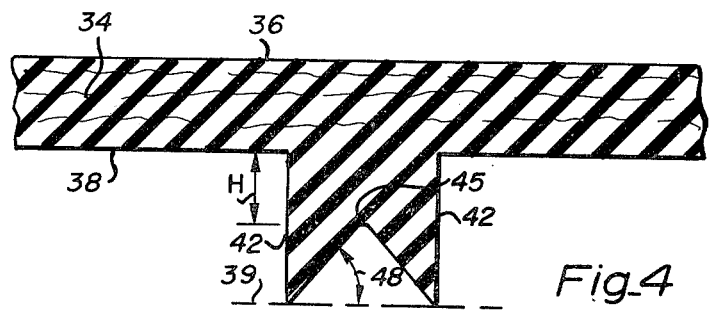
Fig_4
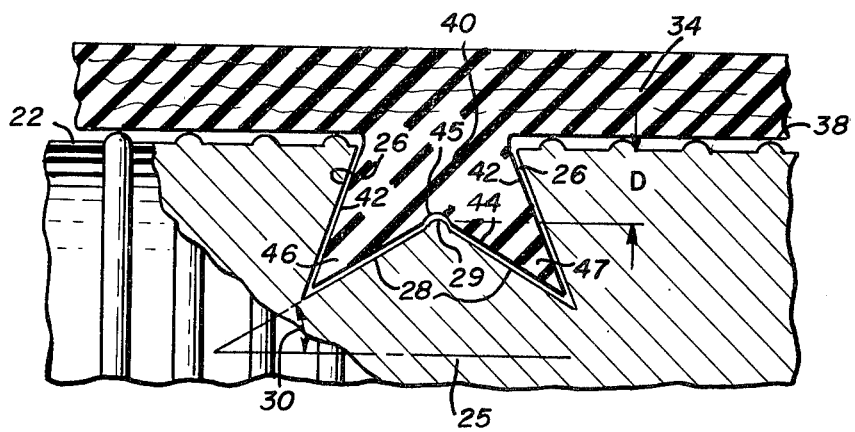
Fig_5
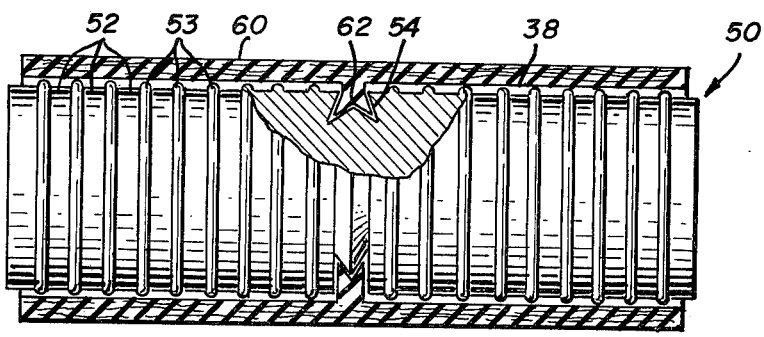
Fig_6

CLOSED LOOP RIBBED BELT/GROOVED PULLEY CONVEYOR SYSTEM

BACKGROUND OF THE INVENTION

1. Field of the Invention

The present invention relates generally to conveyor systems and more particularly, to a closed loop conveyor system including a pair of grooved pulleys and a conveyor belt with longitudinal ribs formed to mate with the grooves to provide a locking engagement between the belt and the pulleys.

2. Description of the Prior Art

Heretofore, endless belts used in closed loop conveyor systems have usually had smooth interior pulley-engaging surfaces and the pulleys used to drive these belts have had smooth driving surfaces which were crowned to maintain the belt centered over the pulley. In cases where off-centered loads are carried by the belt, or where the belts are side loaded, it is not unusual to have cross tensions build up in the belt which are substantial enough to overcome the centering action of the pulley crowns and cause the belt to be thrown off the pulleys.

In an attempt to provide improved centering of the belt over the pulley, V-belt systems have been used. In a V-belt system a rib which is V-shaped in cross section is bonded to the interior surface of the conveyor belt and a corresponding V-shaped groove is formed in the pulley surfaces for receiving the rib as it passes over the pulleys. However, ribs of this configuration still tend to jump out of the groove. When this occurs, the bond between the rib and the carcass generally begins to tear apart. Thus, belts having V-shaped ribs tend to have a reduced useful life.

SUMMARY OF THE PRESENT INVENTION

Accordingly, it is an object of the present invention to provide a closed loop conveyor system having improved alignment characteristics.

Another object of the present invention is to provide a closed loop conveyor system in which the belt is locked to the pulleys as it passes over the pulley surfaces.

Still another object of the present invention is to provide a closed loop conveyor system including grooved pulleys and a unitary ribbed conveyor belt.

Briefly, the conveyor system of the present invention includes a cylindrical drive pulley and a cylindrical return pulley and such other idler pulleys as are needed. The pulleys have an outer surface with at least one annular groove that is generally W-shaped in transverse cross section and is formed by a pair of oppositely beveled side walls and a centrally peaked annular bottom wall. A conveyor belt is disposed around the pulleys and includes an external load-carrying surface and an interior pulley-engaging surface including at least one rib formed in the direction of belt travel. The rib has a pair of parallel side surfaces and a bottom surface which is generally concave in transverse cross section. The side and bottom surfaces bifurcate the rib into two wedging portions. When the belt passes over the pulley, the wedging portions engage and are spread apart by the bottom wall of the groove. In a preferred embodiment the bottom surface has a transverse cross section in the shape of an inverted V.

An important advantage of the present invention is that a conveyor system is provided having substantially improved belt alignment control.

Another advantage of the present invention is that a conveyor system is provided having a conveyor belt with a ribbed interior surface which lockingly engages grooved pulleys to maintain a high degree of belt alignment.

Still another advantage of the present invention is that a belt rib and pulley groove configuration is provided wherein a flexible lock is formed between the pulley and the belt which is automatically released as the belt leaves the pulley.

The foregoing and other features and advantages of the invention will be apparent from the following detailed description of the embodiments illustrated in the several figures of the drawing.

IN THE DRAWING

FIG. 1 is a perspective view illustrating a closed loop conveyor system in accordance with the present invention;

FIG. 2 is a fragmentary perspective view showing the interior side of the conveyor belt shown in FIG. 1;

FIG. 3 is a cross sectional view taken along the line 3—3 of FIG. 1, with portions broken away for clarity;

FIG 4 is a fragmentary cross section taken along the line 4—4 of FIG. 2;

FIG. 5 is a fragmentary cross-sectional view illustrating in detail the locking engagement between rib and groove, with portions broken away for clarity;

FIG. 6 is an elevational view of an alernative embodiment of the invention, with a portion shown in cross section for clarity.

DETAILED DESCRIPTION OF THE PREFERRED EMBODIMENT

In FIG. 1 of the drawing, a closed loop conveyor system in accordance with the present invention is illustrated in perspective and designated by the reference character 10. System 10 includes a cylindrical drive pulley 12, a cylindrical return or tail pulley 14, and an endless belt 18 disposed around the drive and the return pulleys and adapted to be driven by the drive pulley.

Each of the pulleys 12 and 14 includes a central bore 20 and a cylindrical outer surface 22 having a plurality of grooves 24 disposed along their axial length. Each bore 20 is formed about the pulley axis 25 and is adapted to receive a shaft (not shown) about which the pulley rotates. As more clearly shown in FIGS. 3 and 5, the grooves 24 have a generally W shape in transverse cross section. Grooves 24 are formed by a pair of oppositely beveled side walls 26 and a centrally peaked annular bottom wall 28 having an apex 29, formed by two intersecting oppositely inclined surfaces. An angle 30 is formed between the plane of the inclined surfaces forming the bottom wall 28 and the pulley axis 25, and a groove depth D is defined by the radial dimension between apex 29 and the outer surface 22 of the pulley.

with reference to FIG. 5, the side walls 26 of grooves 24 lie in planes that are oblique relative to the pulley radius, being closest together at the pulley outer surface 22 and farthest apart at their intersection with the bottom wall 28.

Referring now to FIGS. 2 and 4, the belt 18 is comprised of flexible carcass 34, preferably fabric reinforced and has an exterior load-carrying surface 36 and an interior surface 38. As clearly illustrated in FIG. 2, a plurality of deformable, resilient groove-engaging ribs 40, elongated in the direction of belt travel, protrude inwardly from the interior surface 38.

The ribs 40 have a pair of side surfaces 42 and a bottom surface 44. The side surfaces 42 are parallel to each other and generally perpendicular to the interior belt surface 38. The bottom surface 44 is generally concave in a transverse cross-sectional view, as illustrated in FIG. 4. The most inverted point 45 is perpendicularly separated from the interior surface 38 by a height H which is substantially equal to the groove depth D. The bottom surface 44 serves to form the rib 40 into a pair of tapered wedging portions 46 and 47. It should be noted that the concavity of the bottom surface causes an angle 48 to be formed between a line 39 parallel to the plane of the interior surface 38 and the bottom surface 44 near the side surfaces 42. In accordance with the present invention, the angle 48 should be greater than the angle 30.

By way of example, in one embodiment, the rib 40 is continuous and the carcass is formed by a four-ply neoprene material. In the preferred embodiment, the bottom surface 44 of rib 40 has an inverted V-shape in transverse cross section and the angle 48 is aproximtely 45°. Alternatively, it will be appreciated that interrupted ribs could also be utilized.

In operation, as the belt 18 passes over the pulley 12, the bottom surface 44 of each of the deformable ribs 40 first contacts the respective bottom wall 28 of the grooves 24. Because the angle 30 is less than the angle 48, the wedging portions 46 and 47 are spread outwardly until the side surfaces 42 contact the side walls 26. With reference to FIG. 3, it can be seen that the ribs have deformed such that the surfaces 42 and 44 matingly engage the walls 26 and 28, respectively, thereby locking each of the ribs 40 within the respective grooves 24. It should be noted that due to the deformation of the rib into conformance with the walls of the groove, the interior surface 38 of the carcass 44 does not contact the cylindrical outer surface 22 of the pulley 12.

From the illustrations of FIGS. 1-5, it can be seen that the previously described belt and pulley combination accomplishes several desirable results. First, the rib and groove engagement provide positive belt alignment to maintain the belt centered over the pulleys in substantially all loading conditions. Second, the rib lockingly engages the groove with the bottom and side surfaces of the rib in frictional contact with the groove to provide substantial good frictional drive between the pulley and the belt. Third, it has been found that belts having ribs of the particularly described shape can be run over smooth pulleys without having to modify the ribs.

Referring now to FIG. 6, an alternative embodiment 50 of the pulleys shown in FIGS. 1 and 3 is shown. In this embodiment, the pulley includes a cylindrical outer surface 52 having a smooth helical ridge 53 formed therearound and a single groove 54 disposed centrally therein. The protruding ridge 53 provides an outer pulley surface having a generally irregular appearance which decreases the area of pulley surface in contact with a belt. As the pulley belt contact area is decreased, the wearing of the belt is also decreased. The belt 60 includes a single centrally protruding rib 62. The groove 54 and rib 62 are similarly constructed to those ribs 40 and grooves 24 illustrated and described in FIGS. 1-5, and similar reference numerals are used to designate corresponding similar parts. As in the previous embodiment, as the rib 62 enters the groove 54, the wedging portions of the rib are spread apart until the rib surfaces conform to the shape of the side walls 26 and the bottom wall 28 of the groove 54, thus locking the belt to the pulley.

Although idler rollers are not illustrated in the figures, a typical closed loop conveyor system may use several such rollers. Normally, certain pulleys in the system will be grooved in accordance with the present invention, while the remainder will have smooth nongrooved outer surfaces. It has been found that pulleys having nongrooved outer surface do not cause excessive wear to a belt formed in accordance with the present invention.

While the invention has been particularly shown and described with reference to certain preferred embodiments, it will be understood by those skilled in the art that various alterations and modifications in form and in detail may be made therein. Accordingly, it is intended that the following claims cover all such alterations and modifications as fall within the true spirit and scope of the invention.

What is claimed is:

1. A closed loop conveyor system comprising:
    a generally cylindrical drive pulley and a generally cylindrical return pulley, at least one of said drive and return pulleys including at least one groove having a generally W-shaped transverse cross section formed by a pair of oppositely beveled side walls radially converging toward the surface of the pulley—has been added in order to more clearly define the shape of the groove in the pulley and a centrally peaked annular bottom wall; and
    a conveyor belt disposed around said drive and return pulleys and including a carcass having an exterior load-carrying surface and an interior surface including at least one rib formed in the direction of belt travel, said rib having a pair of parallel side surfaces and a bottom surface that is generally concave in transverse cross section to form two wedging portions which upon engaging said bottom wall are spread apart to cause said side surfaces to lockingly mate with the side walls of said groove.

2. A closed loop conveyor system as recited in claim 1 wherein said one pulley includes a plurality of said grooves and said conveyor belt includes a plurality of said ribs.

3. A closed loop conveyor system as recited in claim 1 wherein said rib is continous in the direction of belt travel.

4. A closed loop conveyor system as recited in claim 1 wherein said bottom surface is spaced from said interior surface by a dimension that is slightly greater than the depth of said groove.

5. A closed loop conveyor system as recited in claim 1 wherein the width of said groove is greater than the width of said rib.

6. a closed loop conveyor system as recited in claim 1, wherein the contour of said bottom surface may be defined as lying in a pair of intersecting planes which intersect said parallel said surfaces at 45° angles.

7. A closed loop conveyor system as recited in claim 1 wherein in transverse cross section, said bottom surface lies along a pair of intersecting lines which respectively intersect the axis of said pulley at angles of substantially 30°.

8. A closed loop conveyor system as recited in claim 1 wherein said pulley includes a cylindrical outer surface having a plurality of annular ridges protruding therefrom, said ridges serving to contact said interior surface of said belt to maintain said interior surface of said belt out of contact with the outer surface of said pulley, whereby wearing of said belt due to contact with said pulley is reduced.

* * * * *

PO-1050
(5/69)

UNITED STATES PATENT OFFICE
CERTIFICATE OF CORRECTION

Patent No. 3,980,174                       Dated September 14, 1976

Inventor(s) Rene A. Conrad

It is certified that error appears in the above-identified patent and that said Letters Patent are hereby corrected as shown below:

Column 3, line 25, "approximtely" should read --approximately--;

Column 4, line 33, delete "-has been added in order to more clearly";

Column 4, line 34, delete "define the shape of the groove in pulley";

Column 4, line 60, "a" should read "A".

Signed and Sealed this

Sixteenth Day of November 1976

[SEAL]

Attest:

RUTH C. MASON
*Attesting Officer*

C. MARSHALL DANN
*Commissioner of Patents and Trademarks*